United States Patent
Lykken

(10) Patent No.: US 10,448,558 B2
(45) Date of Patent: Oct. 22, 2019

(54) SIDE-FOLD PLANTER BAR

(71) Applicant: NORWOOD SALES Inc., Horace, ND (US)

(72) Inventor: Tom Lykken, Fargo, ND (US)

(73) Assignee: Norwood Sales, Inc., Horace, ND (US)

( * ) Notice: Subject to any disclaimer, the term of this patent is extended or adjusted under 35 U.S.C. 154(b) by 4 days.

(21) Appl. No.: 15/468,338

(22) Filed: Mar. 24, 2017

(65) Prior Publication Data

US 2017/0273233 A1 Sep. 28, 2017

Related U.S. Application Data

(60) Provisional application No. 62/312,989, filed on Mar. 24, 2016.

(51) Int. Cl.
*A01B 73/06* (2006.01)
*A01B 73/04* (2006.01)
*A01B 73/00* (2006.01)

(52) U.S. Cl.
CPC .......... *A01B 73/065* (2013.01); *A01B 73/005* (2013.01); *A01B 73/04* (2013.01)

(58) Field of Classification Search
CPC ....... A01B 73/00; A01B 73/005; A01B 73/02; A01B 73/04; A01B 73/05; A01B 73/06; A01B 73/065
USPC .................................................. 172/311, 483
See application file for complete search history.

(56) References Cited

U.S. PATENT DOCUMENTS

| | | | | |
|---|---|---|---|---|
| 4,119,329 A * | 10/1978 | Smith | ..................... | A01B 51/04 172/240 |
| 4,455,034 A * | 6/1984 | De Graff | ............... | A01B 73/005 172/679 |
| 6,112,827 A * | 9/2000 | Reiber | .................... | A01B 63/32 172/311 |
| 7,854,272 B2 * | 12/2010 | Friggstad | ............. | A01B 73/065 172/311 |
| 7,854,273 B2 * | 12/2010 | Friggstad | ............. | A01B 73/065 172/311 |
| 7,861,795 B2 * | 1/2011 | Dillon | .................... | A01B 73/02 172/311 |
| 9,320,190 B2 * | 4/2016 | Sauder | ................. | A01B 63/145 |

(Continued)

OTHER PUBLICATIONS

"Canadian Application Serial No. 2,962,697, Office Action dated Mar. 23, 2018", 4 pgs.

(Continued)

*Primary Examiner* — Gary S Hartmann
(74) *Attorney, Agent, or Firm* — Schwegman Lundberg & Woessner, P.A.

(57) ABSTRACT

A towable farm implement having a frame element having a field end, a fold gate, and an inner wing tow bar rotatably connected to the frame member. The farm implement having a wing having a wing frame extending from a center end to an outer end. The fold gate can be rotatable between a transport position in which the fold gate is parallel to the main carrier and a field position in which the fold gate is perpendicular to the main carrier. Rotating the fold gate into the transport position can pivot the wing about the inner wing tow bar into a parallel orientation relative to the frame member. Rotating the fold gate into the field position can pivots the wing about the inner wing tow bar into a transverse orientation relative to the frame member.

20 Claims, 4 Drawing Sheets

(56) References Cited

U.S. PATENT DOCUMENTS

| | | | | |
|---|---|---|---|---|
| 9,699,949 B2* | 7/2017 | Lykken | ................ | A01B 51/04 |
| 9,706,701 B2* | 7/2017 | Prickel | ................ | A01C 7/208 |
| 9,781,873 B2* | 10/2017 | Prickel | ................ | A01B 73/065 |
| 9,801,324 B2* | 10/2017 | Lykken | ................ | A01B 73/065 |
| 9,832,921 B2* | 12/2017 | Anderson | ................ | A01B 73/04 |
| 9,839,175 B2* | 12/2017 | Van Mill | ................ | A01C 23/008 |
| 9,907,223 B2* | 3/2018 | Dienst | ................ | A01B 73/065 |
| 9,955,621 B2* | 5/2018 | Stevenson | ................ | A01B 59/00 |
| 9,961,822 B2* | 5/2018 | Sauder | ................ | A01B 63/145 |
| 2005/0087350 A1* | 4/2005 | Bauer | ................ | A01B 73/065 |
| | | | | 172/311 |
| 2006/0090910 A1* | 5/2006 | Houck | ................ | A01B 59/042 |
| | | | | 172/272 |
| 2013/0032365 A1* | 2/2013 | Houck | ................ | A01B 59/042 |
| | | | | 172/311 |
| 2013/0233580 A1* | 9/2013 | Kinzenbaw | ................ | A01B 73/065 |
| | | | | 172/1 |
| 2015/0047312 A1* | 2/2015 | Graham | ................ | A01B 73/065 |
| | | | | 56/396 |
| 2015/0150185 A1* | 6/2015 | Houck | ................ | A01B 59/042 |
| | | | | 172/388 |
| 2017/0049039 A1* | 2/2017 | Houck | ................ | A01B 59/042 |
| 2017/0118903 A1* | 5/2017 | Friggstad | ................ | A01C 7/208 |
| 2017/0295714 A1* | 10/2017 | Sieling | ................ | A01B 73/005 |
| 2018/0153086 A1* | 6/2018 | Lykken | ................ | A01B 51/04 |
| 2019/0124822 A1* | 5/2019 | Czapka | ................ | A01B 73/067 |

OTHER PUBLICATIONS

"Canadian Application Serial No. 2,962,697, Response filed Sep. 7, 2018 to Office Action dated Mar. 23, 2018", 5 pgs.

* cited by examiner

SIDE-FOLD PLANTER BAR

CLAIM OF PRIORITY

This patent application claims the benefit of priority, under 35 U.S.C. Section 119(e), to Tom Lykken, U.S. Patent Application Ser. No. 62/312,989, entitled "SIDE-FOLD PLANTER BAR," filed on Mar. 24, 2016, each of which is hereby incorporated by reference herein in its entirety.

TECHNICAL FIELD

This document pertains generally, but not by way of limitation, to farm implements having deployable planter wings.

BACKGROUND

Farm implements often have a main carrier towable behind a tractor or other motorized farm machinery. Certain implements, such as planting implements, have wings on which a plurality of features can be positioned. The wings extend transversely from the main carrier to align each of the features with a row to be planted or processed with a corresponding farming feature when the farm implement is towed along an axis parallel to the rows. Farm implements are often sized such that about 48 rows can be simultaneously processed resulting in wings that are each about 60 ft. or greater in length. The wings are often attached to the main carrier in a hinged configuration such that the wings can be folded against the main carrier to transport the main carrier when not being operated.

Recently, the wings of the farm implement have been increased in length to accommodate additional planting equipment for simultaneously planting more rows. The main carrier must be structurally reinforced to accommodate for the additional weight of the longer wings and planting equipment, which increases the overall weight of the farm implement. The strain of the increased weight of the farm implement is focused at the hitch connecting the farm implement to the tractor.

OVERVIEW

The present inventors have recognized, among other things, that a problem to be solved can include the strain placed on the tractor hitch from the increased weight of farm implements from extended length and capacity wings. In an example, the present subject matter can provide a solution to this problem, such as by a towable farm implement having a frame element having a field end and a fold gate rotatable from the field end of the frame element. The farm implement can include a wing having a wing frame extending from a center end to an outer end. The fold gate can be rotatably connected to the wing proximate the center end of the wing. The farm implement can also include an inner wing tow bar rotatably connected to the frame member and rotatably connected to the wing between the fold gate and the outer end of the wing. The fold gate can be rotatable between a transport position in which the fold gate is parallel to the main carrier and a field position in which the fold gate is perpendicular to the main carrier. Rotating the fold gate into the transport position can pivot the wing about the inner wing tow bar into a parallel orientation relative to the frame member. Rotating the fold gate into the field position can pivot the wing about the inner wing tow bar into a transverse orientation relative to the frame member.

This overview is intended to provide an overview of subject matter of the present patent application. It is not intended to provide an exclusive or exhaustive explanation of the present subject matter. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
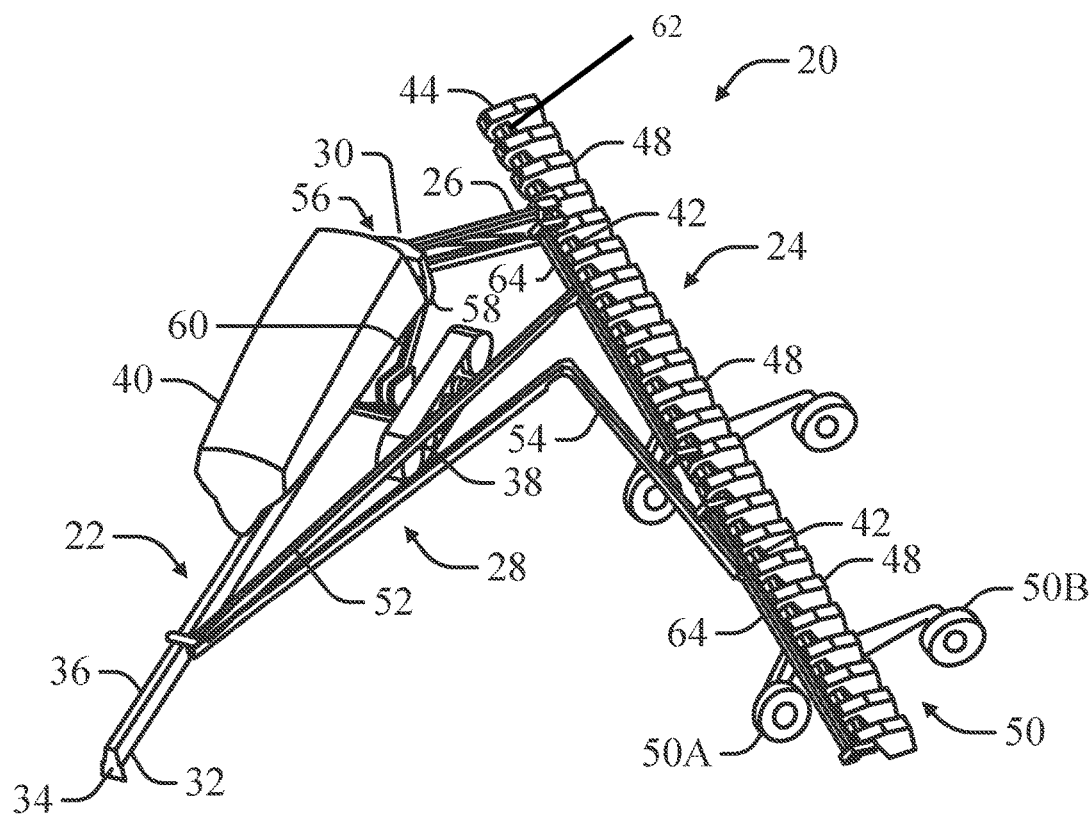
FIG. 1 is a perspective view of a farm implement with a wing moving between a transport position and a field position according to an embodiment of the present disclosure.

As depicted in FIG. 1, a farm implement 20, according to an example of the present disclosure, can comprise a main carrier 22 and at least one wing 24 movably connected to the main carrier 22 with a fold gate 26 and a tow bar assembly 28. Each wing 24 can be moved between a field position where the wings 24 extend transversely outward from the main carrier 22 (shown in FIGS. 2A and 3A) and a transport position in which the wing 24 is positioned alongside the main carrier 22 in a parallel orientation (shown in FIGS. 2C and 3C). The main carrier 22 extend from a field end 30 to a hitch end 32 comprising a hitch assembly 34 for connecting the farm implement 20 to a tractor or other vehicle to tow the farm implement 20. The fold gate 26 and the tow bar assembly 28 are configured to move wings 24 toward the field end 30 of the main carrier 22 as the wings 24 are moved into the transport position to position the center of mass closer to the field end 30 and away from the hitch assembly 34.

As depicted in FIG. 1, the main carrier 22 can comprise a frame member 36 extending from the field end 30 to the hitch end 32 comprising the hitch assembly 34. In this configuration, the hitch assembly 34 can be coupled to a tractor or other vehicle to tow the farm implement 20 such that the field end 30 trails behind the tractor as the farm implement 20 is towed. The main carrier 22 can include at least one support track 38 positioned proximate the field end 30 to support the field end 30 and maintain the main carrier 22 in a horizontal orientation when the hitch assembly 34 is connected to the tractor. As depicted, the support track 38 comprises a continuous track supported on rollers but can comprise individual wheels or wheels arranged in a linear configuration.

As depicted in FIG. 1, in an example, the main carrier 22 can comprise a main housing 40 containing motors, hydraulic equipment, fuel storage, fluid tanks, farming equipment, other farming related equipment, and combinations thereof. The main housing 40 can be positioned proximate to the field end 30 of the frame member 36 such that the weight of the main housing 40 and equipment therein is supported primarily by the support track 38. The positioning of the main housing 40 proximate the field end 30 also positions the support equipment for the farming apparatuses positioned on the wings 24 proximate the wings 24 when the wings 24 are extended in the field position, thereby reducing the required cabling and the length of other connectors.

Figure 2A:
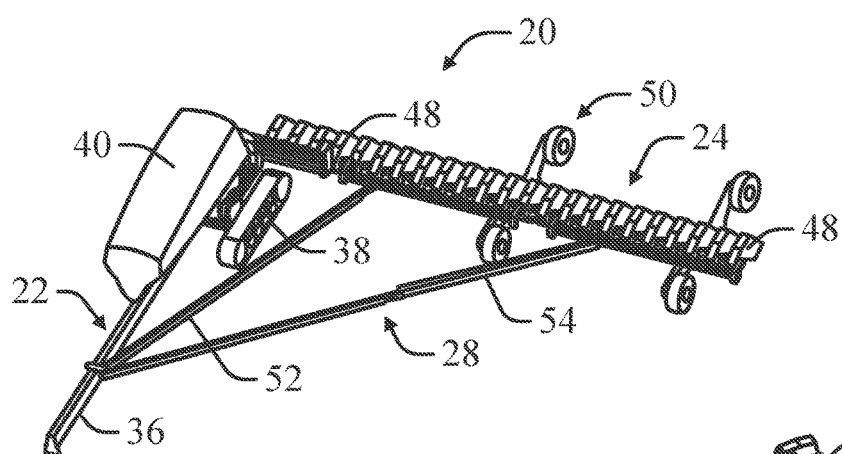
FIG. 2A is a perspective view of a farm implement with a wing positioned in a field position according to an embodiment of the present disclosure.
Figure 2B:
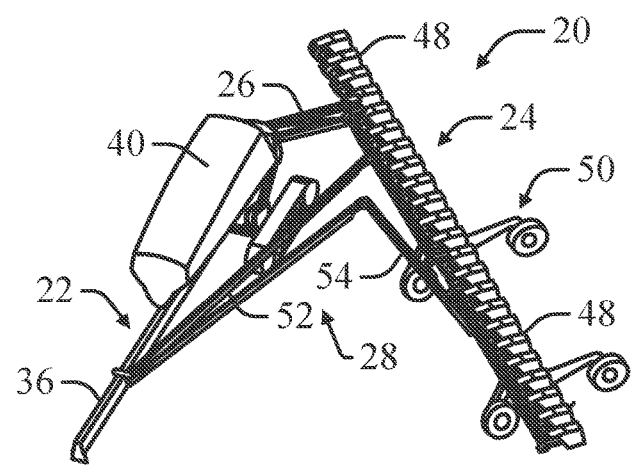
FIG. 2B is a perspective view of the farm implement depicted in FIG. 2B with the wing moving between a transport position and a field position according to an embodiment of the present disclosure.
Figure 3A:
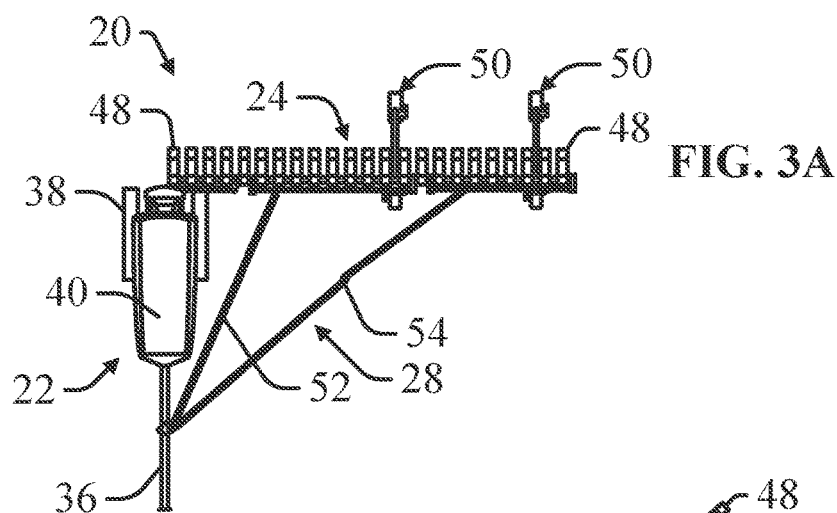
FIG. 3A is a top view of a farm implement with a wing positioned in a field position according to an embodiment of the present disclosure.
Figure 3B:
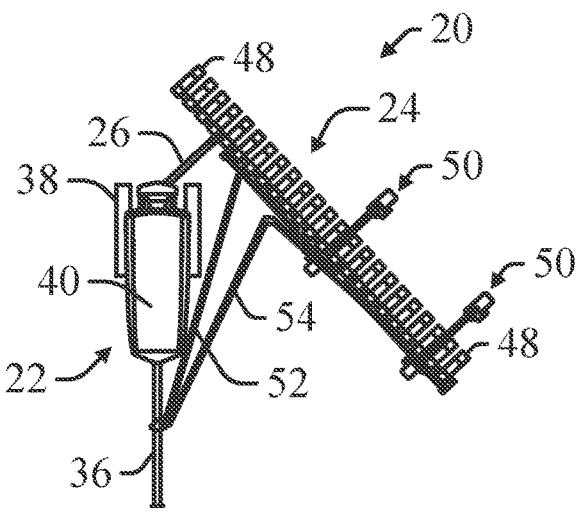
FIG. 3B is a top view of the farm implement depicted in FIG. 3B with the wing moving between a transport position and a field position according to an embodiment of the present disclosure.

As depicted in FIGS. 1, 2A and 3A, each wing 24 can comprise a wing frame 42 extending from a center end 44 to an outer end 46, wherein a plurality of farming apparatuses 48 can be spaced along the wing frame 42. When the wing frame 42 is positioned in the field position, the center end 44 is positioned proximate to the field end 30 of the main carrier 22 to form an "L" shape with the main carrier 22 as illustrated in FIG. 3A. In an example, the farm implement 20 can comprise two wings 24 arranged in a mirroring configuration such that center ends 44 of the wings 24 are positioned proximate to the field end 30 of the main carrier 22 in the field position to form a "T" shape with the main carrier 22. In these configurations, the wings 24 are transverse to the rows to be planted or processed when the main carrier 22 is towed along an axis parallel to the rows. In an example, the farming apparatuses 48 can be arranged on the wing frame 42 to align each farming apparatus 48 with a row to be planted or otherwise processed when the main carrier 22 is towed parallel to the rows. The farming apparatuses 48 can comprise planters for depositing seeds in rows, blades, sprayers, harvesters, and other apparatuses for processing the rows.

As depicted in FIG. 1, in an example, each wing 24 can include at least one secondary support track 50 for supporting the weight of the wing 24 when positioned in the field position. In an example, secondary support track 50 can include two wheels including a front wheel 50A and a trailing wheel 50B, wherein the trailing wheel 50 is positioned rearward from the wing 24 when the farm implement 20 is being pulled behind a tractor as illustrated in FIG. 3A. As depicted, the support track 38 comprises a pair of wheels but can comprise a continuous track supported on rollers, individual wheels or a plurality of wheels arranged in a linear configuration.

As depicted in FIGS. 1, 2A-C, and 3A-C, in an example, the fold gate 26 can be rotatably connected at one end to the main carrier 22 at the field end 30 of the main carrier 22. The fold gate 26 can be rotatably connected at the other end to the wing frame 42 inward from the center end 44. As depicted in FIG. 1, in an example, the tow bar assembly 28 comprises an inner wing tow bar 52 and an outer wing tow bar 54. The inner wing tow bar 52 and the outer wing tow bar 54 are both rotatably connected at one end to the frame member 36 at a position inward from the hitch end 32 of the main carrier 22. The outer wing tow bar 54 can be rotatably connected to the wing 24 inward from the outer end 46 of the wing 24. The inner wing tow bar 52 can be rotatably connected to the wing 24 between the outer wing tow bar 54 and the fold gate 26. The inner wing tow bar 52 and the outer wing tow bar 54 support the wing 24 and reduces strain on the fold gate 26 connecting the main carrier 22 to the wing 24.

As depicted in FIGS. 2A and 3A, in the field position, the fold gate 26 is positioned to extend transversely outward from the field end 30 of the main carrier 22 and oriented parallel to the wing 24 positioned transversely to the main carrier. In operation, the fold gate 26 is rotated from extending transversely outward from the main carrier 22 to extending outward from the field end 30 and oriented parallel to the main carrier 22 in the transport position. The rotation of the fold gate 26 into the transport position moves the center end 44 of the wing 24 outward and rearward from the field end 30. The rearward movement of the wing 24 centers the weight of the wing 24 and the farm implement 20 more rearward toward the support track 38 to reduce strain on the hitch assembly 34. The inner wing tow bar 52 can have a fixed length such that moving the center end 44 of the wing 24 pivots the outer end 46 toward the main carrier 22 and position the wing 24 parallel to the main carrier 22. In this configuration, the outer wing tow bar 54 can be hinged such that the outer wing tow bar 54 collapses as the wing 24 is pivoted toward the transport position.

Figure 2C:
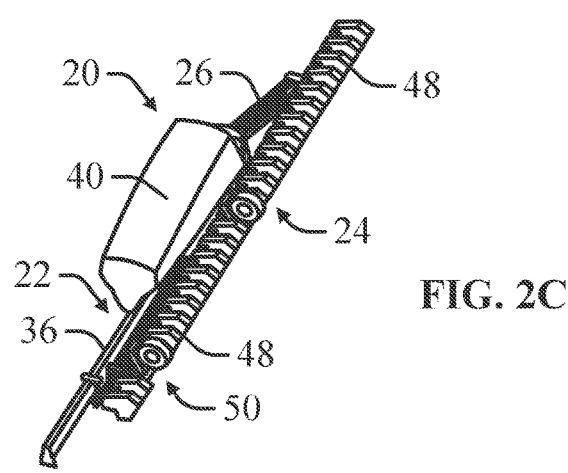
FIG. 2C is a perspective view of the farm implement depicted in FIG. 2A with the wing positioned in the transport position according to an embodiment of the present disclosure.
Figure 3C:
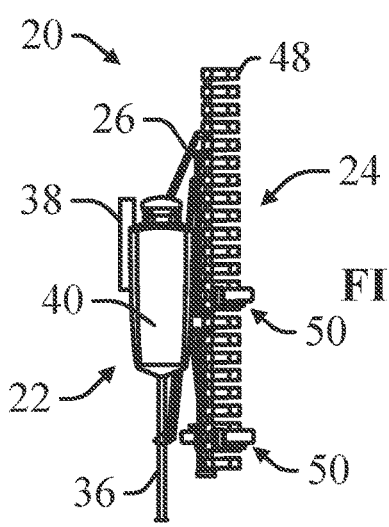
FIG. 3C is a top view of the farm implement depicted in FIG. 3A with the wing positioned in the transport position according to an embodiment of the present disclosure.

As depicted in FIG. 1, the main carrier 22 can include a lift assembly 56 having a mounting bracket 58 moveable vertically by at least one lift arm 60. The lift assembly 56 is positioned at the field end 30 of the frame member 36, wherein the fold gate 26 can be coupled to the frame member 36 to connect the fold gate 26 to the main carrier 22. The mounting bracket 58 can be moved vertically between an elevated position corresponding to the transport position of wing 24 as illustrated in FIGS. 2C and 3C and a lowered position corresponding to the field position of the wing 24 as illustrated in FIGS. 2A and 3A. In this configuration, the inner wing tow bar 52 and the outer wing tow bar 54 are pivotally connected to the main carrier 22 and the wing 24 such that the inner wing tow bar 22 and the outer wing tow bar 54 pivot as the wing 24 is lifted between the elevated position and the lowered position.

Figure 4A:
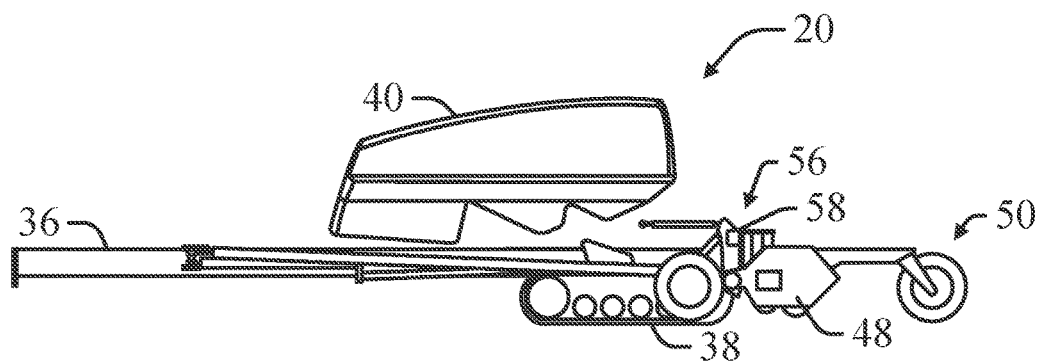
FIG. 4A is a side view of a farm implement with a wing positioned in a field position according to an embodiment of the present disclosure.
Figure 4B:
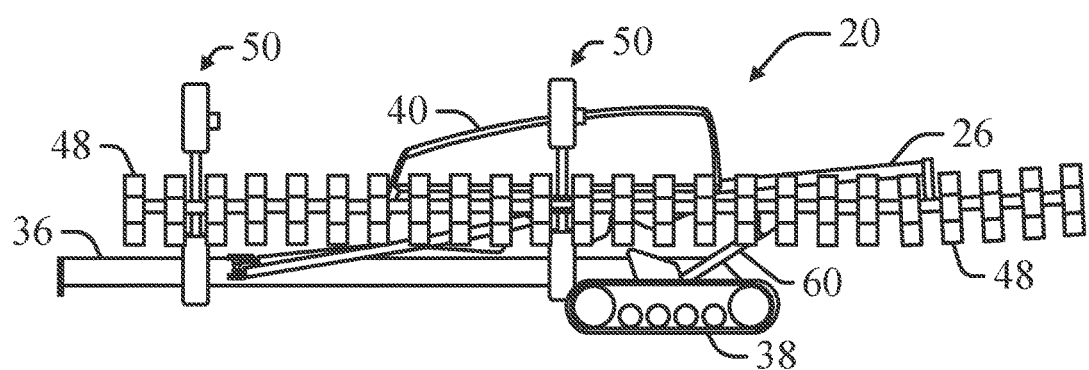
FIG. 4B is a side view of the farm implement depicted in FIG. 4A with the wing positioned in the transport position according to an embodiment of the present disclosure.

As depicted in FIG. 1, in an example, each wing 24 can include a pivot rod 62 positioned parallel to the wing frame 42 and rotatably connected to the wing frame 42 by at least one pivot arm 64. In this configuration, the wire frame 42 and the farming apparatuses 48 and the secondary support track 50 mounted thereon can rotate about the pivot rod 62. The inner wing tow bar 52 and the outer tow bar 54 can be rotatably coupled to pivot rod 62 such that the wing frame 42 can be pivoted to lift the farming apparatuses 48 away from the underlying ground when in the transport position as illustrated in FIGS. 2C and 4B.

VARIOUS NOTES & EXAMPLES

Example 1 is a towable farm implement, comprising: a main carrier having a frame member extending from a field end and a hitch end; a fold gate rotatable from the field end of the main carrier between a transport position in which the fold gate is parallel to the main carrier and a field position in which the fold gate is perpendicular to the main carrier; a wing having a wing frame extending from a center end to an outer end, wherein the fold gate is rotatably connected to the wing proximate the center end of the wing; and an inner wing tow bar rotatably connected to the frame member and rotatably connected to the wing between the fold gate and the outer end of the wing; wherein rotating the fold gate into the transport position pivots the wing about the inner wing tow bar into a parallel orientation relative to the frame member, wherein rotating the fold gate into the field position pivots the wing about the inner wing tow bar into a transverse orientation relative to the frame member.

In Example 2, the subject matter of Example 1 optionally includes at least one support track positioned proximate to the field end of the frame member; wherein rotating the fold gate into the field position moves the wing toward the field end of the frame member to move the center of mass of the towable farm implement toward the at least one support track.

In Example 3, the subject matter of Example 2 optionally includes a main housing mounted on the frame member proximate the field end of the frame member.

In Example 4, the subject matter of any one or more of Examples 1-3 optionally include wherein the wing further comprises: a plurality of farm apparatuses positioned on the wing frame; wherein the plurality of farm apparatuses are spaced apart to correspond to farm rows to be planted.

In Example 5, the subject matter of any one or more of Examples 1-4 optionally include wherein the wing further comprises: a secondary support track positioned beneath the wing frame to support the wing.

In Example 6, the subject matter of any one or more of Examples 1-5 optionally include wherein the wing further comprises: a pivot rod oriented parallel to the wing frame and rotatably connected to the wing frame by at least one pivot arm; wherein the wing frame is rotatably about the pivot arm to rotate the wing between a generally horizontal position when the fold gate is rotated into the field position and a generally vertical position when the fold gate is rotated into the transport position.

In Example 7, the subject matter of Example 6 optionally includes wherein the inner wing tow bar is rotatably connected to the pivot bar.

In Example 8, the subject matter of any one or more of Examples 1-7 optionally include an outer wing tow bar rotatably connected to the frame member and rotatably connected to the wing between the inner wing tow bar and the outer end of the wing; wherein the outer wing tow bar is hinged to collapse as the wing is rotated parallel to the frame member.

In Example 9, the subject matter of any one or more of Examples 1-8 optionally include the main carrier further comprising: a lift assembly configured to move a mounting bracket between an elevated position and a lowered position; wherein the lift assembly is positioned at the field end of the frame element.

In Example 10, the subject matter of Example 9 optionally includes wherein the fold gate is rotatably connected to the mounting bracket such that moving the mounting bracket between the elevated position and the lowered position moves the wing vertically.

Example 11 is a positioning system for a farm implement including a frame member extending from a field end to a hitch end, the farm implement including a wing having a wing frame extending from a center end to an outer end, the positioning system comprising: a fold gate rotatable from the field end of the frame member between a transport position in which the fold gate is parallel to the frame member and a field position in which the fold gate is perpendicular to the frame member, the fold gate being rotatably connected to the wing between the fold gate and the outer end of the wing; and an inner wing tow bar rotatably connected to the frame member and rotatably connected to the wing between the fold gate and the outer end of the wing; wherein rotating the fold gate into the transport position pivots the wing about the inner wing tow bar into a parallel orientation relative to the frame member, wherein rotating the fold gate into the field position pivots the wing about the inner wing tow bar into a transverse orientation relative to the frame member.

In Example 12, the subject matter of Example 11 optionally includes a pivot rod oriented parallel to the wing frame and rotatably connected to the wing frame by at least one pivot arm; wherein the wing frame is rotatably about the pivot arm to rotate the wing between a generally horizontal position when the fold gate is rotated into the field position and a generally vertical position when the fold gate is rotated into the transport position.

In Example 13, the subject matter of any one or more of Examples 11-12 optionally include an outer wing tow bar rotatably connected to the frame member and rotatably connected to the wing between the inner wing tow bar and the outer end of the wing; wherein the outer wing tow bar is hinged to collapse as the wing is rotated parallel to the frame member.

In Example 14, the subject matter of any one or more of Examples 11-13 optionally include a lift assembly configured to move a mounting bracket between an elevated position and a lowered position; wherein the lift assembly is mounted to the field end of the frame element.

In Example 15, the subject matter of Example 14 optionally includes wherein the fold gate is rotatably connected to the mounting bracket such that moving the mounting bracket between the elevated position and the lowered position moves the wing vertically.

Example 16 is a method of positioning a wing of a towable farming implement relative to a frame member, the method comprising: rotating a fold gate from a field end of the frame member between a transport position in which the fold gate is parallel to the main carrier and a field position in which the fold gate is perpendicular to the main carrier; and connecting an inner wing tow bar to the frame member and to the wing between the fold gate and the outer end of the wing; wherein rotating the fold gate into the transport position pivots the wing about the inner wing tow bar into a parallel orientation relative to the frame member, wherein rotating the fold gate into the field position pivots the wing about the inner wing tow bar into a transverse orientation relative to the frame member.

In Example 17, the subject matter of Example 16 optionally includes pivoting the wing about a pivot arm rotatably connected to the wing by at least one pivot arm; wherein the inner wing tow bar is rotatably connected to the pivot arm to connect the inner wing tow bar to the wing.

In Example 18, the subject matter of any one or more of Examples 16-17 optionally include connecting an outer wing tow bar to the frame member and to the wing between the inner wing tow bar and the outer end of the wing; and collapsing the outer wing tow bar as the wing is rotated parallel to the frame member.

In Example 19, the subject matter of any one or more of Examples 16-18 optionally include mounting a lift assembly to the field end of the frame element; and moving the mounting bracket between an elevated position and a lowered position.

In Example 20, the subject matter of Example 19 optionally includes wherein the fold gate is rotatably connected to the mounting bracket such that moving the mounting bracket between the elevated position and the lowered position moves the wing vertically.

Each of these non-limiting examples can stand on its own, or can be combined in any permutation or combination with any one or more of the other examples.

The above-detailed description includes references to the accompanying drawings, which form a part of the detailed description. The drawings show, by way of illustration, specific embodiments in which the present subject matter can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein," Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the present subject matter should be determined with reference to the appended claims, along with the full scope of equivalents to which such claims are entitled.

What is claimed is:

1. A towable farm implement, comprising:
   a main carrier having a frame member extending from a field end and a hitch end;
   a fold gate rotatable from the field end of the main carrier between a transport position in which the fold gate is parallel to the main carrier and a field position in which the fold gate is perpendicular to the main carrier;
   a wing having a wing frame extending from a center end to an outer end, wherein the fold gate is rotatably connected to the wing proximate the center end of the wing; and
   an inner wing tow bar rotatably connected to the frame member and rotatably connected to the wing between the fold gate and the outer end of the wing;
   wherein rotating the fold gate into the transport position pivots the wing about the inner wing tow bar into a parallel orientation relative to the frame member, wherein rotating the fold gate into the field position pivots the wing about the inner wing tow bar into a transverse orientation relative to the frame member.

2. The towable farm implement of claim 1, further comprising:
   at least one support track positioned proximate to the field end of the frame member;
   wherein rotating the fold gate into the field position moves the wing toward the field end of the frame member to move the center of mass of the towable farm implement toward the at least one support track.

3. The towable farm implement of claim 2, further comprising:
   a main housing mounted on the frame member proximate the field end of the frame member.

4. The towable farm implement of claim 1, wherein the wing further comprises:
   a plurality of farm apparatuses positioned on the wing frame;
   wherein the plurality of farm apparatuses are spaced apart to correspond to farm rows to be planted.

5. The towable farm implement of claim 1, wherein the wing further comprises:
   a secondary support track positioned beneath the wing frame to support the wing.

6. The towable farm implement of claim 1, wherein the wing further comprises:
  a pivot rod oriented parallel to the wing frame and rotatably connected to the wing frame by at least one pivot arm;
  wherein the wing frame is rotatably about the pivot arm to rotate the wing between a horizontal position when the fold gate is rotated into the field position and a vertical position when the fold gate is rotated into the transport position.

7. The towable farm implement of claim 6, wherein the inner wing tow bar is rotatably connected to the pivot bar.

8. The towable farm implement of claim 1, further comprising:
  an outer wing tow bar rotatably connected to the frame member and rotatably connected to the wing between the inner wing tow bar and the outer end of the wing;
  wherein the outer wing tow bar is hinged to collapse as the wing is rotated parallel to the frame member.

9. The towable farm implement of claim 1, the main carrier further comprising:
  a lift assembly configured to move a mounting bracket between an elevated position and a lowered position;
  wherein the lift assembly is positioned at the field end of the frame element.

10. The towable farm implement of claim 9, wherein the fold gate is rotatably connected to the mounting bracket such that moving the mounting bracket between the elevated position and the lowered position moves the wing vertically.

11. A positioning system for a farm implement including a frame member extending from a field end to a hitch end, the farm implement including a wing having a wing frame extending from a center end to an outer end, the positioning system comprising:
  a fold gate rotatable from the field end of the frame member between a transport position in which the fold gate is parallel to the frame member and a field position in which the fold gate is perpendicular to the frame member, the fold gate being rotatably connected to the wing between the fold gate and the outer end of the wing; and
  an inner wing tow bar rotatably connected to the frame member and rotatably connected to the wing between the fold gate and the outer end of the wing;
  wherein rotating the fold gate into the transport position pivots the wing about the inner wing tow bar into a parallel orientation relative to the frame member, wherein rotating the fold gate into the field position pivots the wing about the inner wing tow bar into a transverse orientation relative to the frame member.

12. The positioning system of claim 11, further comprising:
  a pivot rod oriented parallel to the wing frame and rotatably connected to the wing frame by at least one pivot arm;
  wherein the wing frame is rotatably about the pivot arm to rotate the wing between a horizontal position when the fold gate is rotated into the field position and a vertical position when the fold gate is rotated into the transport position.

13. The positioning system of claim 11, further comprising:
  an outer wing tow bar rotatably connected to the frame member and rotatably connected to the wing between the inner wing tow bar and the outer end of the wing;
  wherein the outer wing tow bar is hinged to collapse as the wing is rotated parallel to the frame member.

14. The positioning system of claim 11, further comprising:
  a lift assembly configured to move a mounting bracket between an elevated position and a lowered position;
  wherein the lift assembly is mounted to the field end of the frame element.

15. The positioning system of claim 14, wherein the fold gate is rotatably connected to the mounting bracket such that moving the mounting bracket between the elevated position and the lowered position moves the wing vertically.

16. A method of positioning a wing of a towable farming implement relative to a frame member, the method comprising:
  rotating a fold gate from a field end of the frame member between a transport position in which the fold gate is parallel to the main carrier and a field position in which the fold gate is perpendicular to the main carrier; and
  connecting an inner wing tow bar to the frame member and the wing between the fold gate and the outer end of the wing;
  wherein rotating the fold gate into the transport position pivots the wing about the inner wing tow bar into a parallel orientation relative to the frame member, wherein rotating the fold gate into the field position pivots the wing about the inner wing tow bar into a transverse orientation relative to the frame member.

17. The method of claim 16, further comprising:
  pivoting the wing about a pivot arm rotatably connected to the wing by at least one pivot arm;
  wherein the inner wing tow bar is rotatably connected to the pivot arm to connect the inner wing tow bar to the wing.

18. The method of claim 16, further comprising:
  connecting an outer wing tow bar to the frame member and the wing between the inner wing tow bar and the outer end of the wing; and
  collapsing the outer wing tow bar as the wing is rotated parallel to the frame member.

19. The method of claim 16, further comprising:
  mounting a lift assembly to the field end of the frame element; and
  moving the mounting bracket between an elevated position and a lowered position.

20. The method of claim 19, wherein the fold gate is rotatably connected to the mounting bracket such that moving the mounting bracket between the elevated position and the lowered position moves the wing vertically.

* * * * *